United States Patent
Abe et al.

(10) Patent No.: US 7,918,344 B2
(45) Date of Patent: Apr. 5, 2011

(54) METHOD FOR REMOVAL OF UNBURNED CARBON FROM FLY ASH

(75) Inventors: Kazuo Abe, Tokyo (JP); Takao Suzuki, Tokyo (JP); Hitoshi Koyama, Tokyo (JP); Kazuyoshi Matsuo, Ichihara (JP); Shinichiro Saito, Kumagaya (JP)

(73) Assignee: Mitsui Engineering & Shipbuilding Co., Ltd., Tokyo (JP)

( * ) Notice: Subject to any disclaimer, the term of this patent is extended or adjusted under 35 U.S.C. 154(b) by 224 days.

(21) Appl. No.: 11/991,462

(22) PCT Filed: Dec. 15, 2006

(86) PCT No.: PCT/JP2006/325019
§ 371 (c)(1),
(2), (4) Date: Mar. 5, 2008

(87) PCT Pub. No.: WO2007/074657
PCT Pub. Date: Jul. 5, 2007

(65) Prior Publication Data
US 2009/0134070 A1 May 28, 2009

(30) Foreign Application Priority Data
Dec. 29, 2005 (JP) .................... 2005-380551

(51) Int. Cl.
*B03D 1/02* (2006.01)
(52) U.S. Cl. ........................ 209/164; 209/166
(58) Field of Classification Search .............. 209/164, 209/166
See application file for complete search history.

(56) References Cited

U.S. PATENT DOCUMENTS
| | | | |
|---|---|---|---|
| 3,770,213 A * | 11/1973 | Lynn et al. ................ 241/20 |
| 5,167,798 A * | 12/1992 | Yoon et al. ................ 209/170 |
| 5,840,179 A * | 11/1998 | Minkara et al. ............ 209/166 |

FOREIGN PATENT DOCUMENTS
| | | |
|---|---|---|
| JP | 63-104668 A | 5/1988 |
| JP | 63-143928 A | 6/1988 |
| JP | 11-278914 A | 10/1999 |
| JP | 3613347 B1 | 11/2004 |

\* cited by examiner

*Primary Examiner* — Thomas M Lithgow
(74) *Attorney, Agent, or Firm* — Kubovcik & Kubovcik

(57) ABSTRACT

Disclosed is a method for removing unburned carbon from fly ash at low cost and within a short time. The method comprises the steps of adding a collecting agent to fly ash directly, agitating/mixing the mixture in a mixer (5), adding water to the resulting mixed material in a mixing vessel (7) to yield a slurry, applying a shearing force to the slurry in a submerged stirrer (9), and performing flotation separation of unburned carbon in a flotator (15).

2 Claims, 9 Drawing Sheets

METHOD FOR REMOVAL OF UNBURNED CARBON FROM FLY ASH

BACKGROUND OF THE INVENTION

1. Field of the Invention

The invention relates to a method for removing unburned carbon from fly ash, in particular a method for removing unburned carbon contained in fly ash discharged from coal fired power plants.

2. Description of the Related Art

Coal can be stably utilized as an energy source in the long term as the ratio of its proven reserves to annual production is more than 200 years. Therefore, the ratio of coal fired power generation to total power generation has been increasing year by year and the amount of coal ash generated (hereinafter referred to as "fly ash") is expected to increase in the future.

In such circumstances, the large amount of fly ash needs to be efficiently utilized from the viewpoints of environmental conservation and the effective utilization of resources.

In order to expand the range of applications and amount of fly ash that is usable, it is necessary to improve the quality by removing the unburned carbon from fly ash, which will then lead to the expansion of applications such as a cement admixture, for example.

Therefore, the applicant has invented the method shown in FIG. 8, where slurry is generated by adding water to fly ash 60 in a mixing tank 62, a shearing force is applied to the slurry in a submerged stirrer 66 and then the unburned carbon in fly ash is efficiently removed in a floatation unit 72 (Refer to Patent document 1).

Patent document 1: Japan Patent No. 3613357

In the method described in the above referred to patent document 1, as shown in FIG. 9(*a*), in order to enable for unburned carbon 91, which is adherent to fly ash 90 or loose, to reach a capturing agent 92 as shown in FIG. 9(*b*) by adding shearing force in a submerged stirrer 66 thereto after adding an oil-based capturing agent 92 to slurry that includes a large amount of water 93 that has no affinity to oil content, it has been necessary to either add more energy to the shearing force to eliminate the water 93, or to add larger amount of capturing agent 92 than the amount of unburned carbon 91 content.

However, in either method, the issue exists that the cost of removing unburned carbon from the fly ash becomes too expensive, and this is because a driving power for the submerged stirrer 66 increases and longer time mixing is required.

BRIEF SUMMARY OF THE INVENTION

Taking these issues into consideration, the present invention was achieved with the purpose of providing a method for removing unburned carbon from fly ash at low cost and in a short time.

In order to achieve the above purpose, the present invention relates to a method for removing unburned carbon in fly ash wherein a mixture is generated by adding 0 to 40 wt % of water and a capturing agent to fly ash and mixing it, and a slurry is generated by adding more water to this mixture, then a shearing force is then applied to the slurry, and the unburned carbon in the fly ash is separated by floatation by supplying air while adding a foaming agent to the slurry to which the shearing force is applied and stirring.

According to the present invention, as the capturing agent is added to the fly ash that contains water content to the extent that it does not become slurry and is stirred and mixed, it is possible to reduce the driving energy required for stirring and mixing as it is not necessary to remove so much water from among fly ash and capturing agent.

It is desirable for the mixer to be a high speed flow type mixer or a ribbon blender.

Regarding as the high-speed flow type mixer, paddle-type mixer, an Eirich and a Henshel mixer are all available.

According to the method for removing unburned carbon in fly ash relating to the present invention, since it is possible to reduce the driving energy of the submerged stirrer and to lower the residual volume of unburned carbon by optimizing the amount of added capturing agent, it is possible to obtain a high quality fly ash at low cost and in a short time.

DETAILED DESCRIPTION OF THE INVENTION

Figure 1:
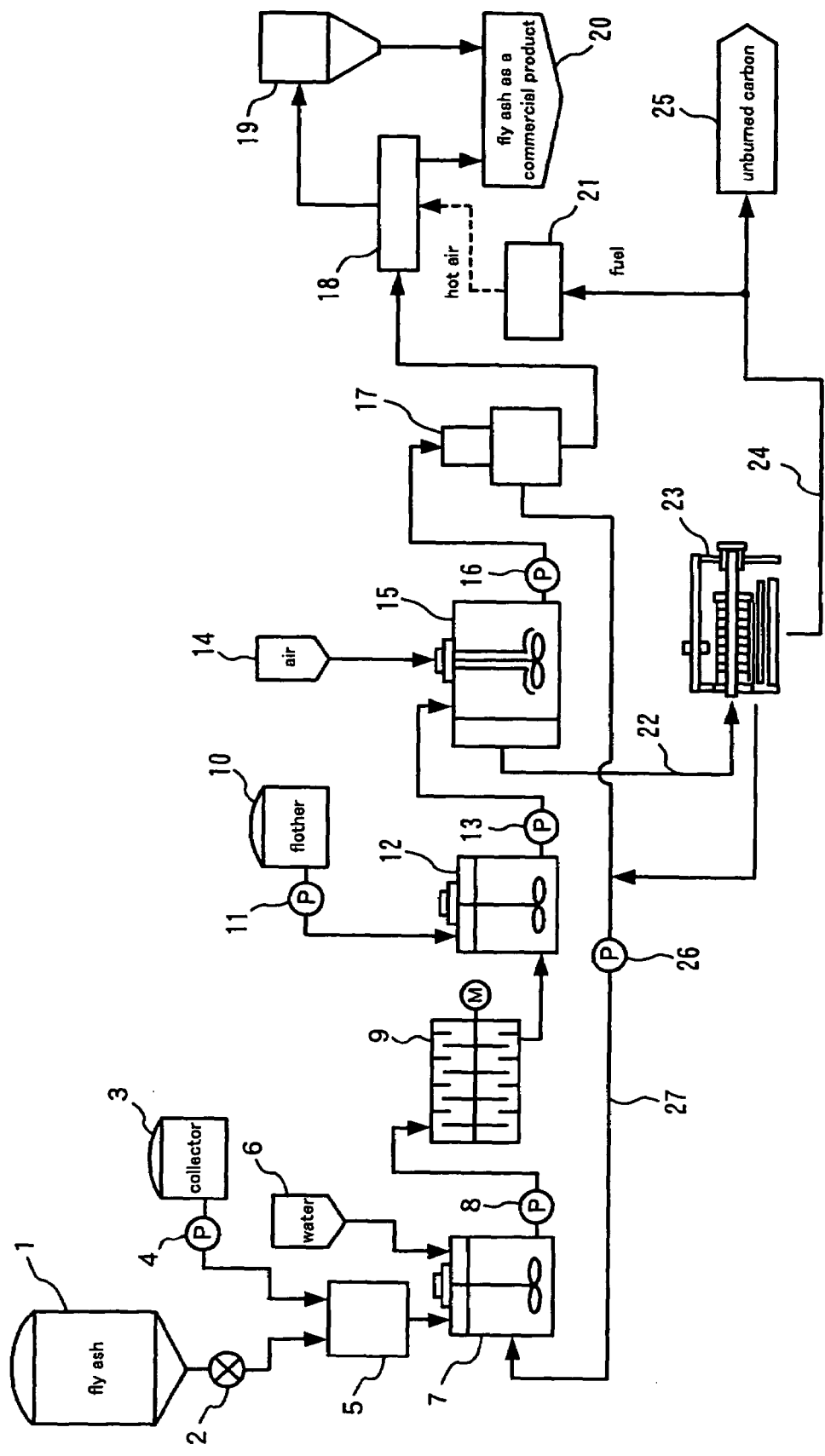
FIG. 1 shows a schematic diagram of a plant system according to the embodiment of the present invention.

Here the best form of the embodiment according to the present invention is described in reference to FIG. 1. FIG. 1 is a schematic diagram of a plant system for implementing the present invention.

This system is mainly composed of mixer 5 that adds a capturing agent to fly ash to mix, mixing tank 7 that generates slurry by adding water to the mixed fly ash and capturing agent, submerged stirrer 9 that applies high shearing force to the slurry, adjusting tank 12 that generates air bubbles by adding a foaming agent to the slurry to which the high shearing force was applied, floatation unit 15 that separates unburned carbon by supplying air while stirring the slurry, and adhering the unburned carbon in the fly ash to the air bubble and floating, solid-liquid separator 17 that separates and recovers the fly ash from the sediment separated in floatation unit 15, and hydro-extractor 23 that recovers the unburned carbon by dehydrating the floatating substances after being separated in the floatation unit 15.

Next, the equipments composing the plant system are described in detail below.

Fly ash tank 1 is a tank that stores fly ash discharged from a coal fired power plant (not shown in the drawings). Unburned carbon that remains unburned upon combustion of coal in a boiler of a coal fired power plant adheres to or is contained in the fly ash.

Volumetric feeder 2 is a machine that feeds a certain volume of fly ash from the fly ash stored in the fly ash tank 1 to the mixer 5, into which a rotary valve, for example, is utilized.

Capturing agent tank 3 is a tank that stores the capturing agent that is fed to the mixer 5 via pump 4. As the capturing agent, any of kerosene, diesel oil or heavy oil can be used.

Mixer 5 is a high-speed flow type mixer used to add the capturing agent directly to the fly ash, to stir and mix them and also to apply shearing force to the mixture.

Here, since the amount of capturing agent is very small compared to the amount of fly ash, it is desirable to add water for atomizing the capturing agent by less than the 40 wt % that is the limit to the mixture not becoming slurry, or it is desirable to add water by 5 to 15 wt % to the fly ash with regard to suppressing the generation of dust from the fly ash and that the adhesive force among fly ashes should not be too large.

Figure 2:
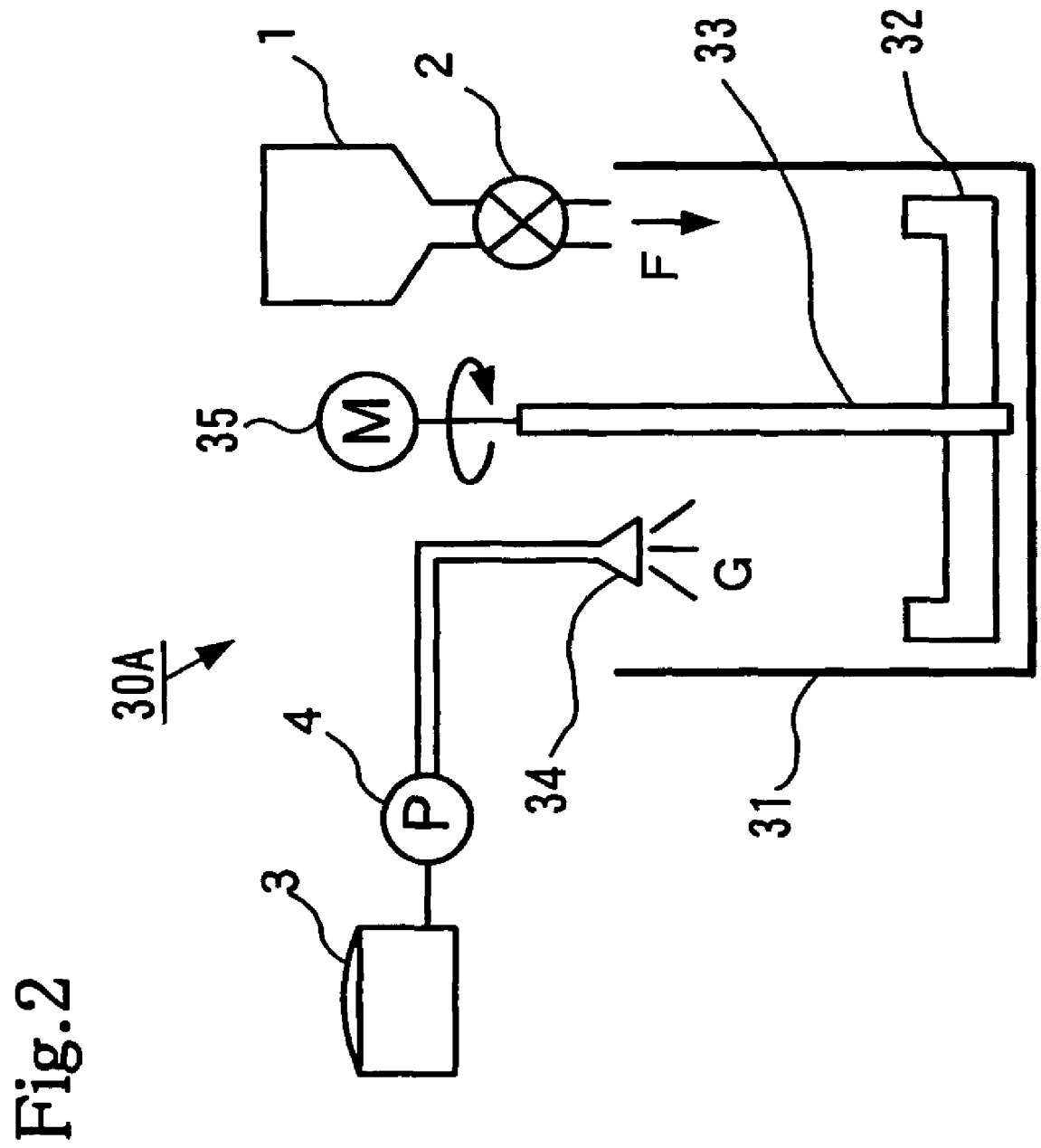
FIG. 2 shows a cross sectional view illustrating the structure of a mixer according to the first embodiment of the present invention.

FIG. 2 shows the first embodiment of this mixer. FIG. 2 shows a cross sectional view illustrating the structure of the mixer according to the first embodiment.

Mixer 30A according to this embodiment is that is so called "paddle-type" mixer and has the structure in which rotation shaft 33 that has multiple L-shape stirring paddles 32 is inserted down into vertically placed hollow cylindrical vessel 31 from above. At the top of the hollow cylindrical vessel 31, volumetric feeder 2 that feeds a specified amount of fly ash F from the fly ash tank 1 and atomizer 34 that sprays capturing agent G containing water supplied via the pump 4 from capturing agent tank 3 are arranged.

Fly ash F fed to mixer 30A is stirred and mixed with capturing agent G by stirring paddle 32 that is rotated by electric motor 35, then it is applied a shearing force and discharged from the discharge port not shown in the diagram.

This mixer 30A has the feature that the structure is simple and it is easy to handle.

Figure 3:
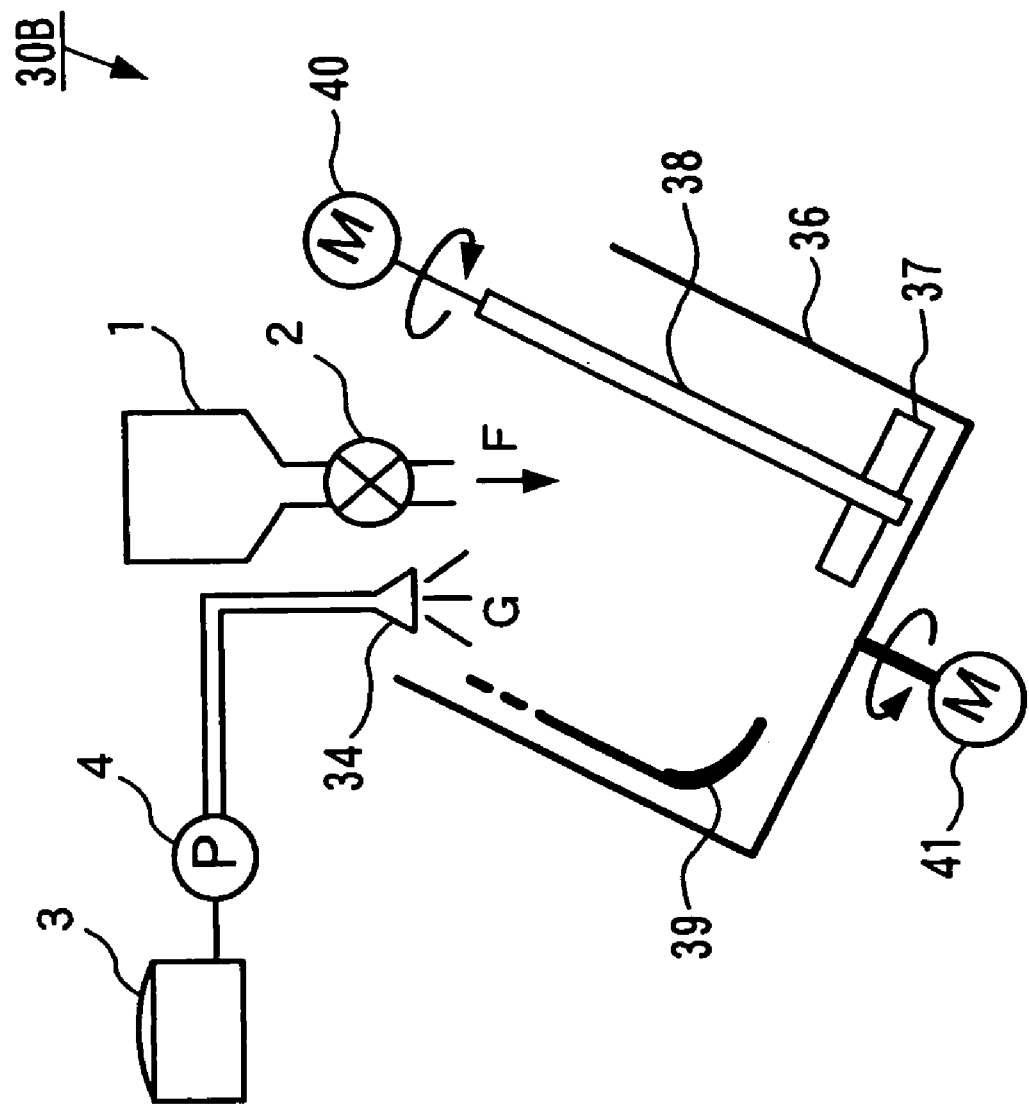
FIG. 3 shows a cross sectional view illustrating the structure of a mixer according to the second embodiment of the present invention.

FIG. 3 shows the second embodiment. FIG. 3 shows a cross sectional view illustrating the structure of mixer according to the second embodiment, and the same parts as those of FIG. 2 are designated by similar numbers.

Mixer 30, according to this embodiment, is that is so called as "Eirich Mixer" (product of Japan Eirich Co.), that has the structure in which agitator 38 having small stirring paddle 37 is inserted at the eccentric position inside the hollow cylindrical vessel 36 placed obliquely from the above. Vessel 36 and agitator 38 rotate mutually in reverse direction. At the top in the vicinity of the bottom surface of vessel 36 placed obliquely, scraper 39 is arranged.

Fly ash F and capturing agent G fed to mixer 30B rotate together with the vessel 36 and a high shearing force is applied by stirring paddle 37 of agitator 38 that rotates in reverse direction at the eccentric position. And, since fly ash F and capturing agent G that are carried up to the top of vessel 36 due to its rotation are reversed by the scraper 39, the vertical mixing in the vessel 36 is accelerated.

In such a way, this mixer 30B has the feature that it is possible to execute dense and uniform mixing and, at the same time, to apply high shearing force.

Figure 4:
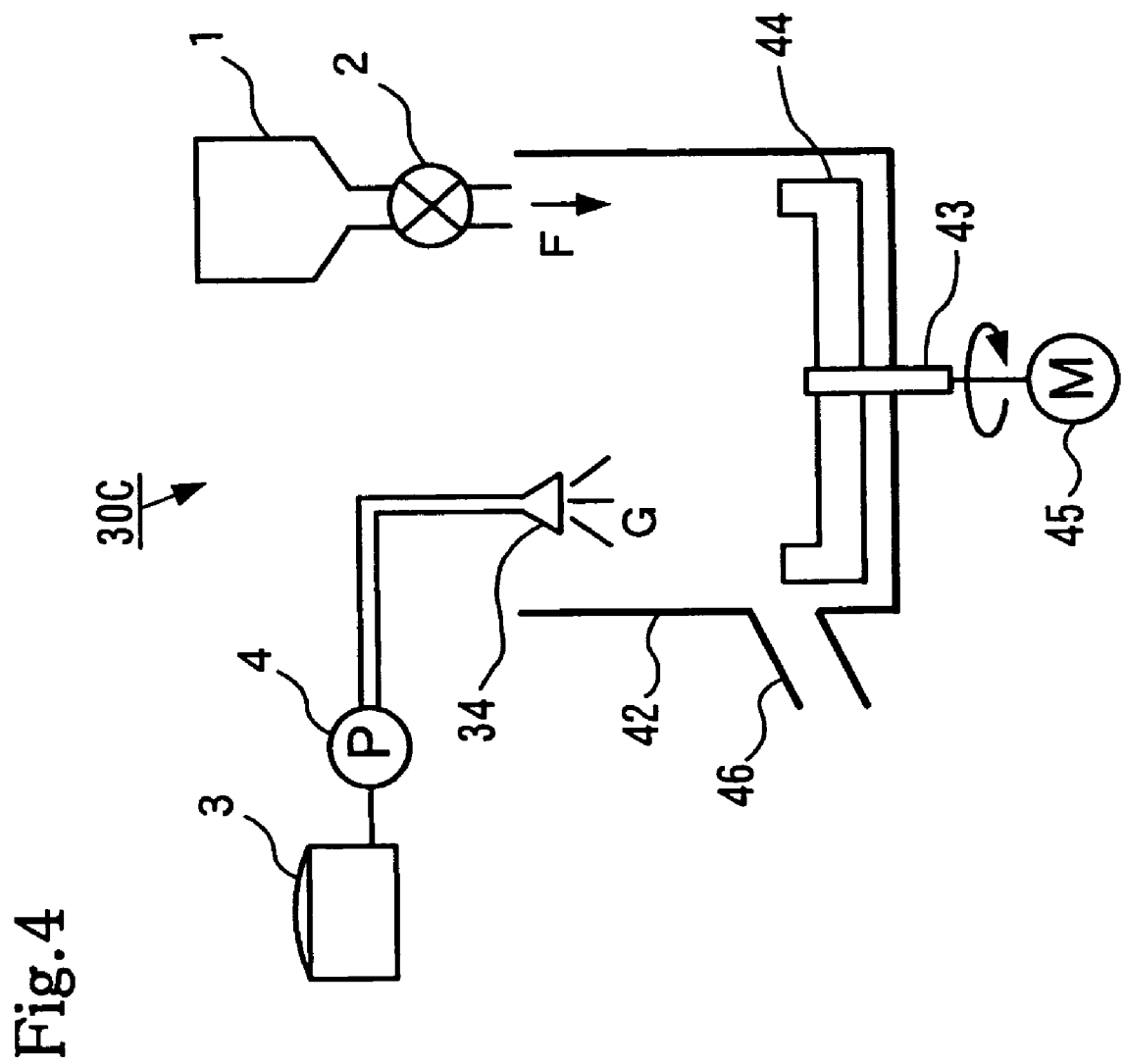
FIG. 4 shows a cross sectional view illustrating the structure of a mixer according to the third embodiment of the present invention.

FIG. 4 shows the third embodiment of the mixer. FIG. 4 shows a cross sectional view of the mixer according to the third embodiment, and the same parts as those of FIG. 2 are designated by similar numbers.

Mixer 30C according to this embodiment is that is so called as "Henshel Mixer" (product of Mitsui Miike Kakoki, Co.) that has the structure in which L-shape stirring paddle 44 installed to the top of rotary shaft 43 is arranged near the bottom surface of the vertically placed hollow cylindrical vessel 42. Rotary shaft 43 is connected to driver 45 passing vertically through the bottom surface of the vessel 42. At the lower side surface of the vessel 42, discharge port 46 is attached obliquely downward.

Fly ash F and capturing agent G fed to this mixer 30C are discharged through discharge port 46 after convection stirring and mixing are executed on them and a shearing force is applied to them with stirring paddle 44 that rotates at high speed.

This mixer 30C has the feature that it is possible to execute mixing and applying a shearing force in a short time.

Figure 5:
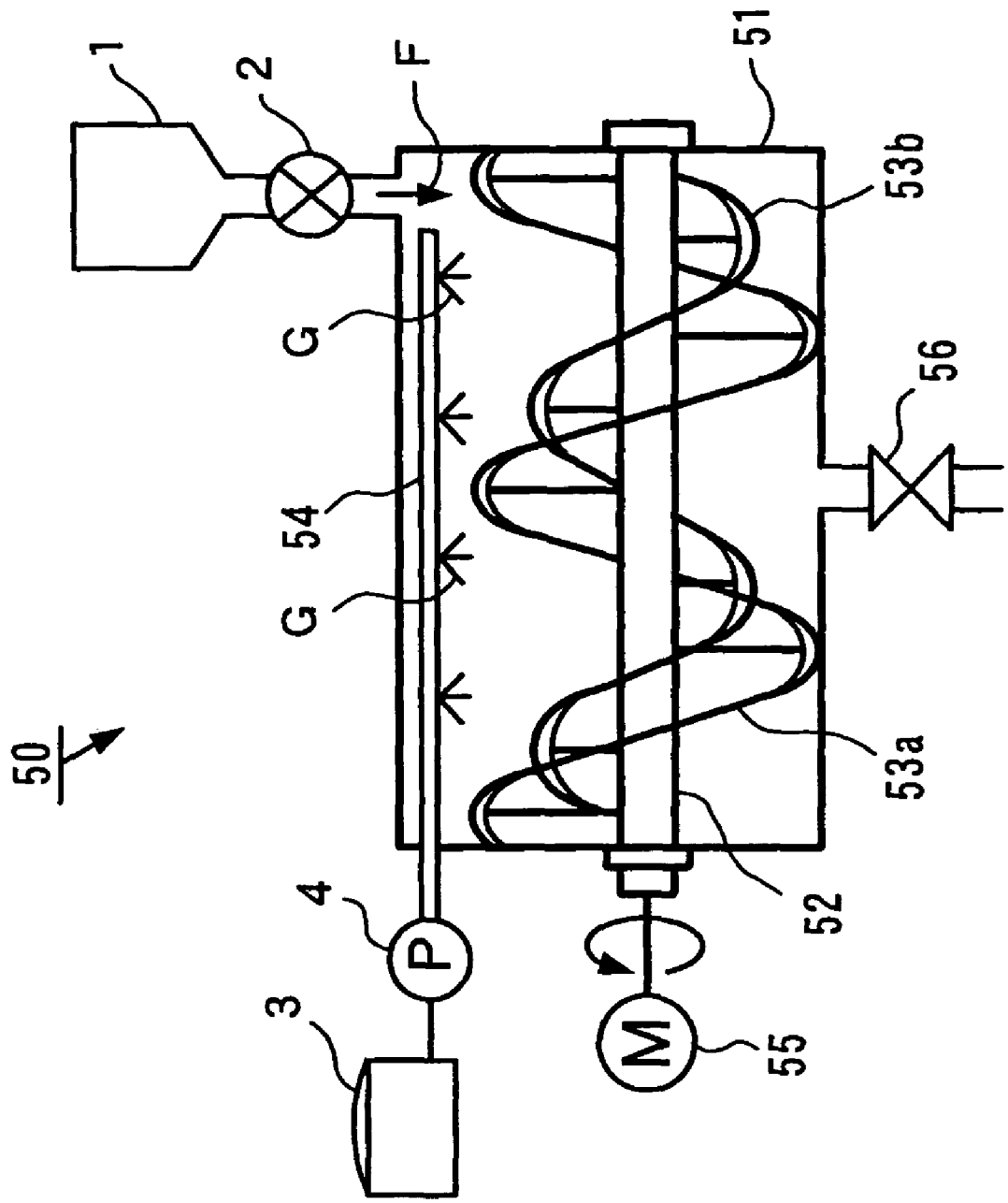
FIG. 5 shows a cross sectional view illustrating the structure of a mixer according to the fourth embodiment of the present invention.

FIG. 5 shows the fourth embodiment of the mixer. FIG. 5 shows a pattern diagram illustrating the structure of the mixer of the fourth embodiment according to the present invention.

Mixer 50 according to the present invention is that is so called as "Ribbon Blender". This mixer is composed of main body 51 that takes a rectangular solid of which bottom surface is shaped in convex and like a semicyclinder, and rotary shaft 52 installed in parallel to the direction of axis inside the main body 51. At rotary shaft 52, ribbon like paddles 53a and 53b that transfer the objective substance mutually in reverse direction are installed so as to spirally surround the rotary shaft 52. The top surface of the main body 51 is connected to volumetric feeder 2 that feeds a given amount of fly ash, and to the inner-top part of the main body 51, atomizing tube 54 for spraying capturing agent G is installed in parallel to the direction of axis.

Figure 6:
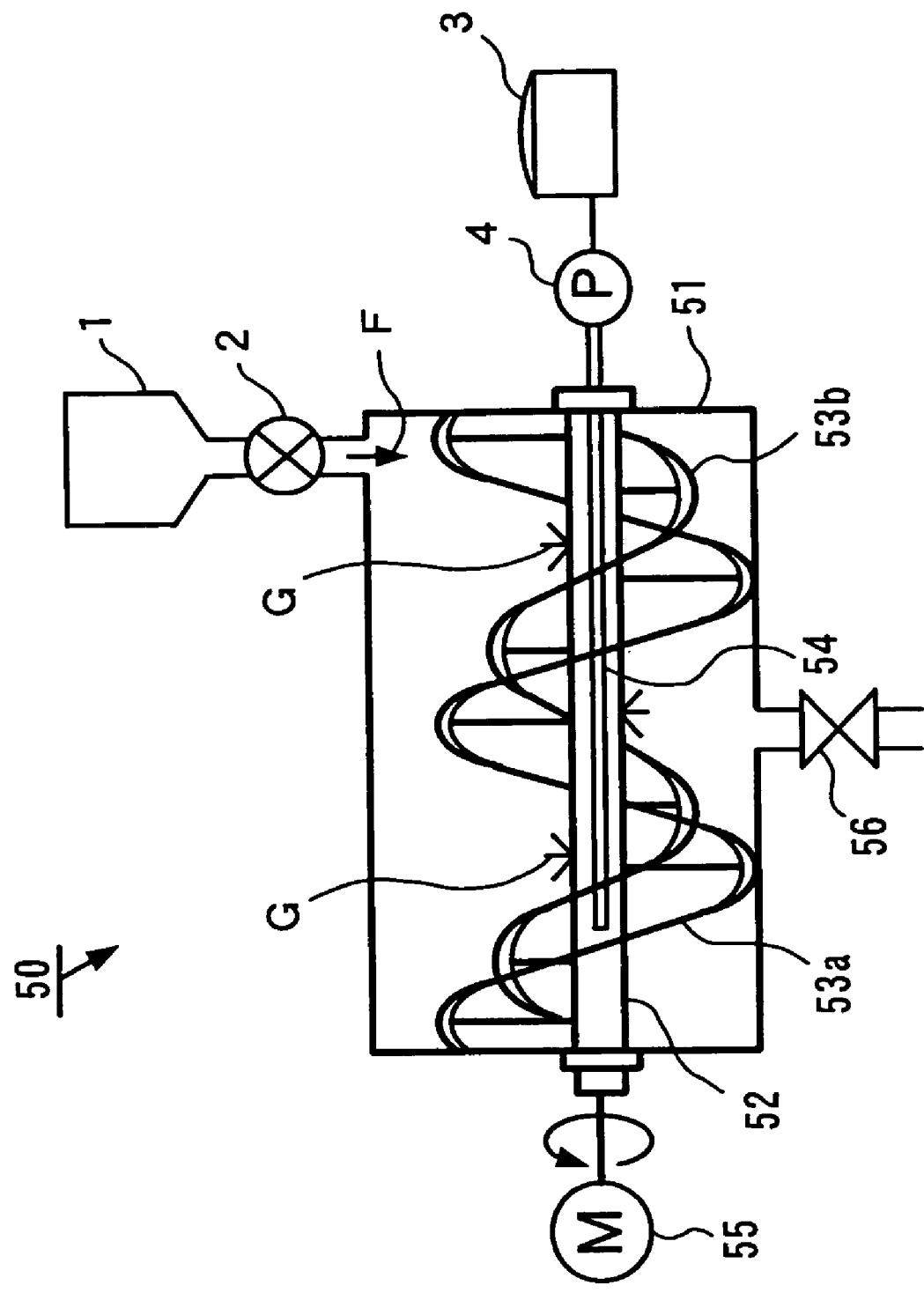
FIG. 6 shows a cross sectional view illustrating the structure of a modified example of a mixer according to the fourth embodiment of the present invention.

Here, the atomizing tube 54 may be arranged inside the rotary shaft 52 as shown in FIG. 6.

Fly ash F fed to this mixer 50 is moved like a shape of 8 looking at from the side view, and is stirred and mixed together with capturing agent G sprayed from the atomizing tube 54 installed at the upper-top part or inside of the rotary shaft, and finally is discharged from discharge port 56.

This mixer 50 has the feature that the structure is simple and it is possible to process high volume of fly ash.

In any mixers according to the embodiments described above, it is desirable to compose mixers with multiple stages by connecting multiple mixers in series so as to enable to continuously and effectively mix of fly ash and capturing agent.

Figure 7:
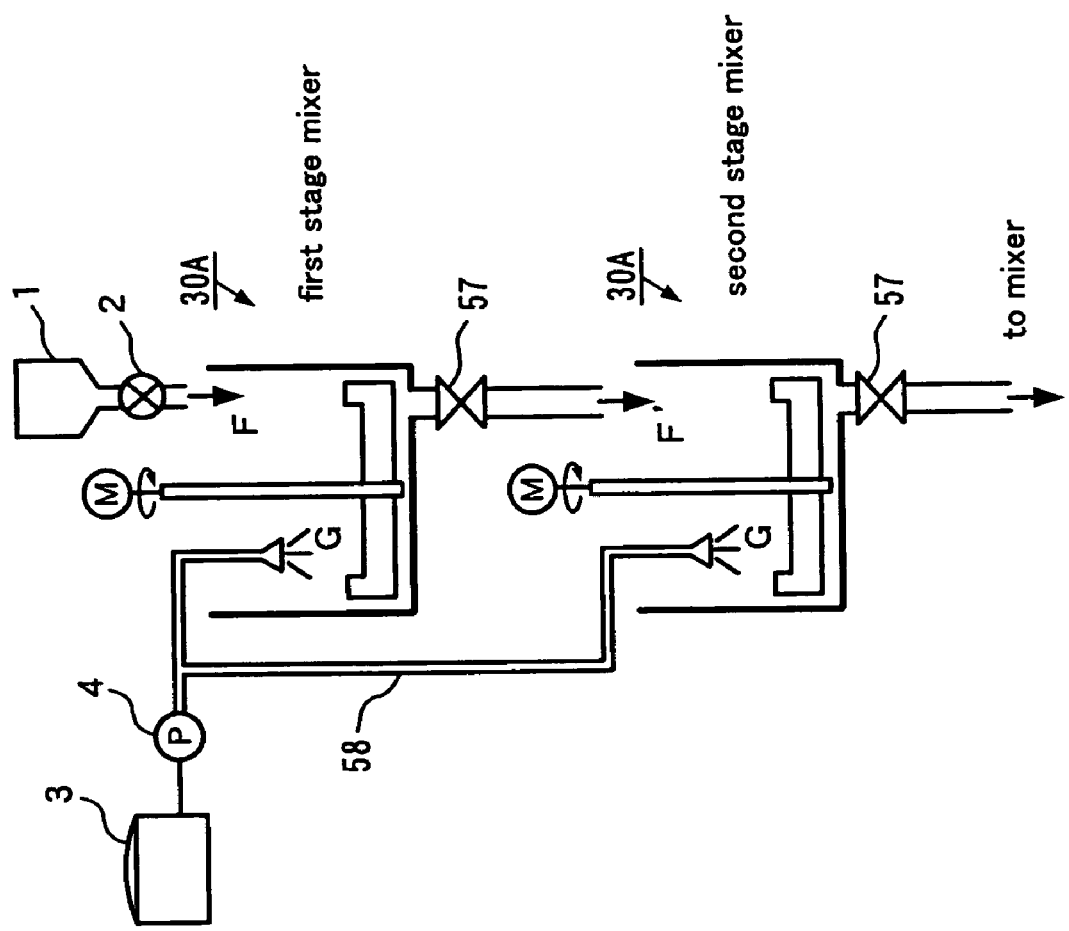
FIG. 7 shows a schematic diagram of a system in case that two mixers according to the first embodiment of the present invention are connected in series.
Figure 8:
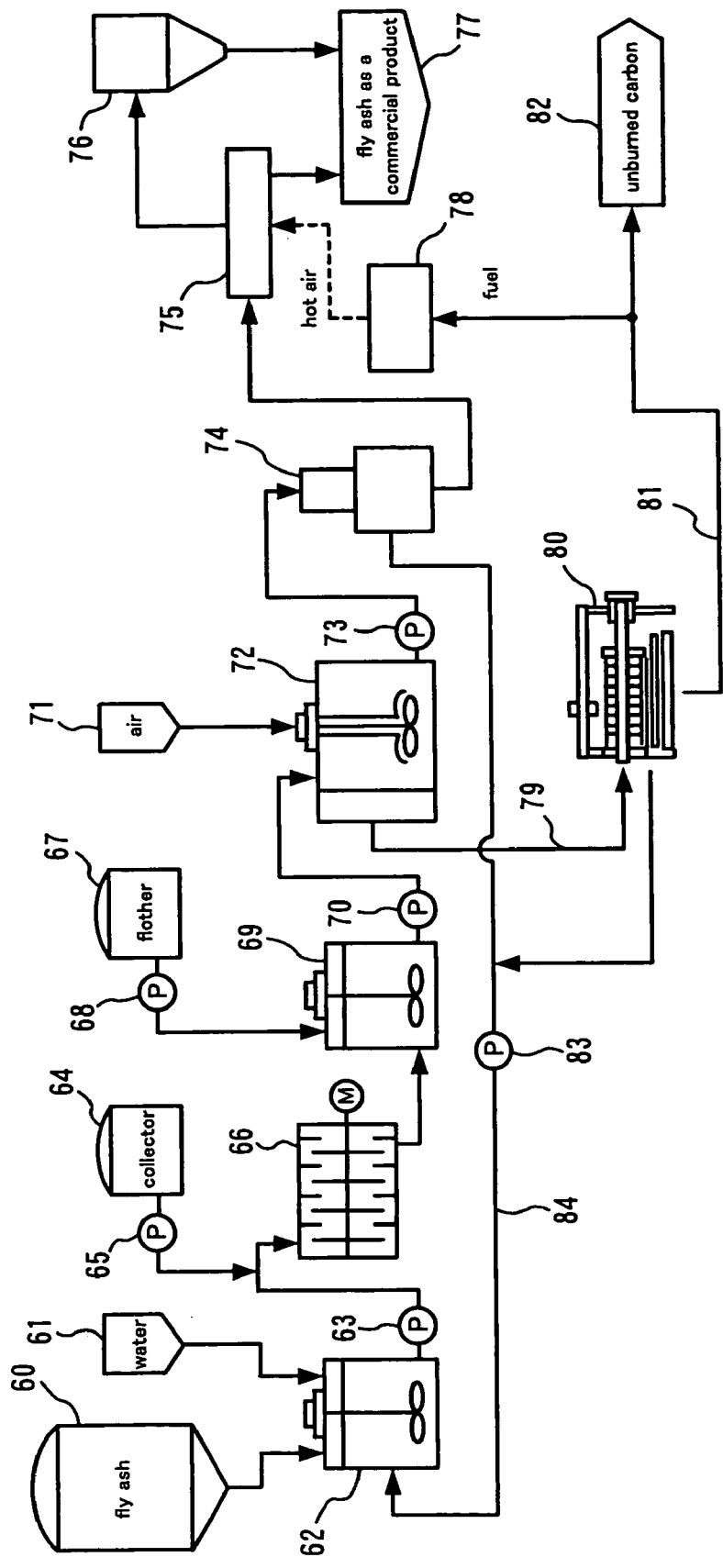
FIG. 8 shows a schematic diagram of a plant system according to the conventional embodiment prior to the present invention.
Figure 9:
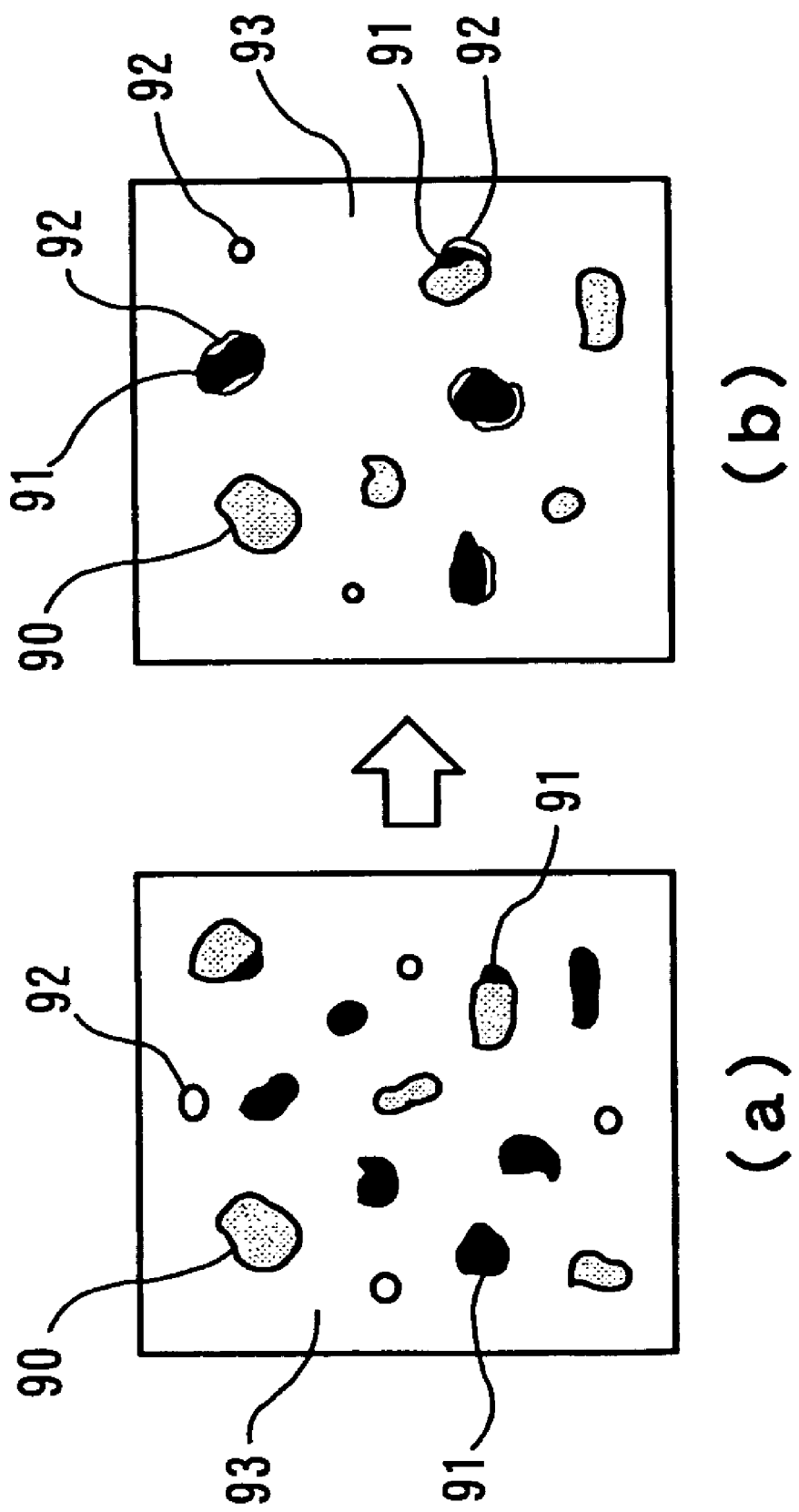
FIG. 9 shows a diagram that explains the state of the slurry before and after the shearing force is applied, wherein (a) shows the state before the shearing force is applied and (b) shows the state after the shearing force is applied.

FIG. 7 shows a configuration example that serially connects mixer 5 with multiple stages. FIG. 7 corresponds to the case where two mixers 30A according to the first embodiment are connected, in which similar numbers are given to the same parts as those of FIG. 2.

Fly ash F and capturing agent G fed to the first stage mixer are mixed in the mixer 30A and, after a shearing force is applied to, the mixture is fed to the second stage mixer through discharge port 57. Mixture F fed to the second stage mixer is mixed again with capturing agent G fed through tube 58 and a shearing force is applied again.

Here, a method for connecting the mixers is not limited to the one shown in FIG. 7, but it is of course good to connect three or more mixers depending on an objective performance, or to connect a plurality of the mixers according to other embodiments to the ones of the same embodiment or to the ones of the different embodiments.

Mixing tank 7 adjusts slurry by mixing fly ash and capturing agent that are mixed in mixer 5 by mixing with water fed from water feeder 6.

Submerged stirrer 9 applies a high shearing force to the slurry that is adjusted in the mixing tank 7 by stirring with high speed to modify unburned carbon's surface.

Adjusting tank 12 is a tank in which foaming agent fed through pump 11 from foaming agent tank 10 is added and mixed to the slurry discharged from submerged stirrer 9, by which the slurry becomes to a state that is possible to easily generate air bubbles.

Floatation unit 15 is a machine that separates unburned carbon by supplying air to the slurry fed through pump 13 while stirring to adhere the unburned carbon to air bubbles, and to float the air bubbles to the surface. As the method for supplying air used at this time, such methods that absorb air by rotation of stirrer in floatation unit 15, or although it is not shown in diagrams, that forcibly inject air by air supplying equipment (such as blower) are desirable.

The unburned carbon separated as the floating substances in the floatation unit 15 is transferred through pipe 22 to hydro-extractor 23. The slurry from which unburned carbon is separated and recovered as the sediment in the floatation unit 15 is transferred through pump 16 to solid-liquid separator 17.

Solid-liquid separator 17 is a machine that separates the slurry to fly ash and water. Separated fly ash is transferred to dryer 18 as a cake, and separated water is returned through circulation tube 27 by pump 26 to mixing tank 7 to be recycled as water for generating slurry.

Dryer 18 is a machine to dry the fly ash as a cake with hot air generated by air heating furnace 21. The fly ash after drying from which unburned carbon is separated becomes fly ash 20 as a commercial product and utilized as cement admixture, etc.

Bag filter 19 is a machine that recovers the fine powder of fly ash generated during the drying process in the dryer 18 by conducting the filtration dust collection, and the recovered fly ash also becomes fly ash 17 as a commercial product.

Hydro-extractor 23 is a machine that dehydrates the unburned carbon separated as the floating substances in the floatation unit 15. Examples of hydro-extractor 23 include, filterpress and the like. In this case, the floating substances are dehydrated by pressurizing with a filter.

Since unburned carbon 25 after being dehydrated can be used as a fuel, a part of this is supplied to air heating furnace 21 to generate hot air used in the dryer 18.

The water separated in the hydro-extractor 23 is transferred to the circulation tube 27 to be recycled in the mixing tank 7 similarly to the water separated from the solid-liquid separator 17.

Next, a method for separating unburned carbon from fly ash that uses the above described system is described in reference to FIG. 1.

Fly ash is cut out from fly ash tank 1 by the volumetric feeder 2 and input to the mixer 5, and it is stirred and mixed with a capturing agent fed from capturing agent tank 3. Then, a shearing force is applied to this mixture.

At this time, in the mixer 5, since powdered fly ash is directly stirred and mixed, there exists no water differently from the case of slurry, driving energy to eliminate water from the mixture of fly ash and capturing agent is not required and, at the same time, added capturing agent can easily reach to the fly ash. Also, since a shearing force is applied to the unburned carbon contained in fly ash while stirring, and a part of shearing force that should be applied in the submerged stirrer 9, which is a downstream process, can be borne on the unborned carbon, it is possible to reduce the driving energy of the submerged stirrer 9 to this extent.

The amount of capturing agent added in the mixer 5 is set to 0.05 to 10 wt % for fly ash when kerosene is used as a capturing agent.

Due to the very small amount of capturing agent for fly ash, water for atomizing capturing agent should be added by less than 40 wt % for fly ash, or more preferably, by 5 to 15 wt %.

Since a shearing force of 10 to 50 kWh/m$^3$ per unit weight is applied, or more preferably, 20 to 40 kWh/m$^3$ is applied to fly ash, it is possible to reduce the driving energy of the submerged stirrer 9 by about 50%.

In this way, the mixture of fly ash and capturing agent that is stirred and mixed and to which a shearing force is applied is transferred to the mixing tank 7.

In the mixing tank 7, slurry is generated by adding water to the mixture from water feeder 6 to mix. Concentration of generated slurry at this time is desirable to be in the range of 10 to 30 wt %.

Then, a high shearing force is applied to this slurry by mixing and stirring up in the submerged stirrer 9. Owing to the high shearing force, the surface of the unburned carbon contained in the slurry is modified, an affinity to capturing agent 37 is increased and a floatability to separate by floatation of the unburned carbon is increased in floatation unit 15 in the later stage process.

Next, the slurry applied high shearing force is transferred to adjusting tank 12 to add a foaming agent and mix so as to make the slurry to easily generate air bubbles. The slurry is stirred and supplied air in the floatation unit 15, then the unburned carbon contained in fly ash 36 is separated while adhering to air bubbles with capturing agent 37 and floating.

Since the unburned carbon separated as the floating substances by this means contains much water, it is dehydrated in the hydro-extractor 23 so that it may be utilized as a fuel.

Fly ash 20 as a commercial product can be also obtained by recovering the slurry from which the unburned carbon was separated as the sediment and by drying in dryer 18 after separating the water in the solid-liquid separator 17. The yield of fly ash 20 as a commercial product can be increased by recovering the fine powder of fly ash in the dryer 18 by using the bag filter 19.

As for the water separated in the solid-liquid separator 17 and the hydro-extractor 23, it is transferred through the circulation tube 27 to the mixing tank 7 to recycle for generating slurry.

What is claimed is:

1. A method for removing unburned carbon from fly ash, wherein a capturing agent and a predetermined amount of water is or are added to the fly ash and stirred in a high speed flow type mixer to generate a mixture without forming a slurry, water is further added to the mixture to generate a slurry, then a shearing force is applied to the slurry, a foaming agent is added to the slurry to which the shearing force is applied, and the unburned carbon is separated by floatation from the fly ash by supplying air while stirring the resulting slurry, wherein the predetermined amount of water is from 5 to 15 wt %.

2. A method for removing unburned carbon from fly ash, wherein a capturing agent and a predetermined amount of water is or are added to the fly ash and stirred in a ribbon blender to generate a mixture without forming a slurry, water is further added to the mixture to generate a slurry, then a shearing force is applied to the slurry, a foaming agent is added to the slurry to which the shearing force is applied, and the unburned carbon is separated by floatation from the fly ash by supplying air while stirring the resulting slurry, wherein the predetermined amount of water is from 5 to 15 wt %.

* * * * *